Patented May 4, 1926.

1,583,263

UNITED STATES PATENT OFFICE.

BURNHAM C. STICKNEY, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed July 14, 1922. Serial No. 574,866.

*To all whom it may concern:*

Be it known that I, BURNHAM C. STICKNEY, a citizen of the United States, residing in Elizabeth, in the county of Union and State of New Jersey, have invented certain new and useful Improvements in Typewriting Machines, of which the following is a specification.

The present invention relates to platens for typewriting machines, and to processes for making the same.

An object of the invention is the production of a platen, which, in use, may be relatively noiseless, and assure ease of type-key operation, and which, nevertheless, will assure clearness of type-impressions.

A further feature of the invention is the introduction into the platen of a typewriting machine of a core or base of such character that, when the same is jacketed or faced with any one of various materials, the printing will be of high quality.

The body is formed by winding a thin web of Pará rubber under high tension, and stretched to the desired thinness, around a large drum, until the desired thickness of rubber cushioning material is attained; the drum being preferably in the nature of an anvil which opposes inertia to the type-blows, and consists of a heavily overweighted metal tube or cylinder. The rubber is covered with exterior wear-resisting material. The rubber and exterior material together form a tympan or surfacing for the drum, to soften and equalize the type-blows.

Other features and advantages will hereinafter appear.

In the accompanying drawings.

Figure 1:
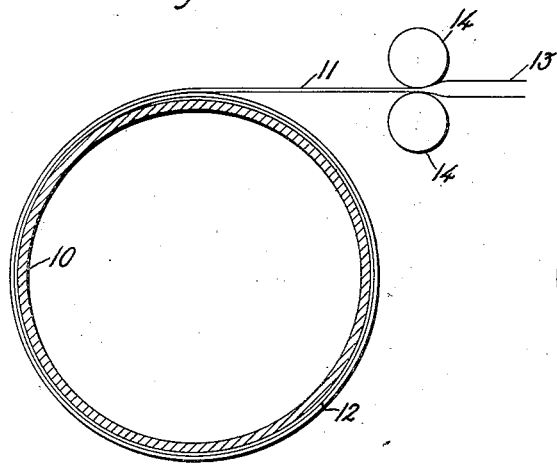
Figure 1 is a view in cross-section through a platen in the process of formation; a web of rubber being wound under high tension to form a jacket on the drum.
Figure 2:
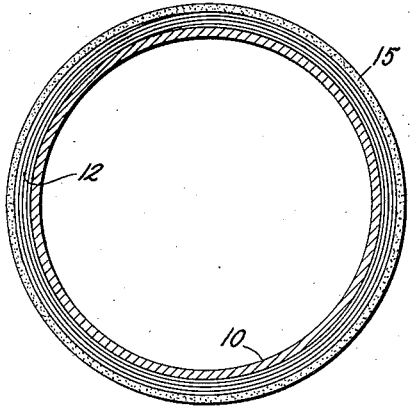
Figure 2 is a view in cross-section of the Figure 1 platen completed; a tubular jacket or facing of relatively hard rubber, celluloid, or other suitable material, being in place on the tensioned-rubber jacket.

In the embodiment of the invention shown in Figures 1 and 2, the core 10 of the platen is preferably a steel tube which may be about an inch in diameter and $\frac{1}{32}$ of an inch in thickness.

On the tube 10, a rubber web 11 is wound, under high tension, in layers to form a jacket 12 (see Figure 2) of any desired thickness. Ordinarily a thickness of from $\frac{1}{16}$ to $\frac{1}{8}$ of an inch for the jacket 12 will be sufficient and satisfactory. In forming the jacket, the rubber web is led, untensioned as indicated at 13, from any suitable source, to tensioning rolls 14, from between which it emerges under tension as indicated at 11. When wound to desired thickness, the outer end of the tensioned web is cemented, or otherwise secured, to the face of the jacket formed by the web.

The jacket 12 having been formed on the drum, an outer jacket or wearing facing therefor is provided, consisting of a thin tubular shell 15 which may be of the relatively hard rubber usually constituting the platen jacket of a typewriting machine, or which may be of celluloid or other material suitable as a back against which typewriting may be effected. The facing-tube 15 may be slipped on over the jacket 12, but should fit the same snugly.

In a platen made as above described, the jacket or core 12 will be of great elasticity because of the high tension under which it is wound, but without yielding to the type-blows so much as untensioned soft rubber would do; and will thus conduce to clear-cut type-impressions. Such a jacket may be faced, as described, and a platen thus obtained, against which the types will strike with a muffled or deadened sound, as compared to the platens commonly in use.

Figure 3:
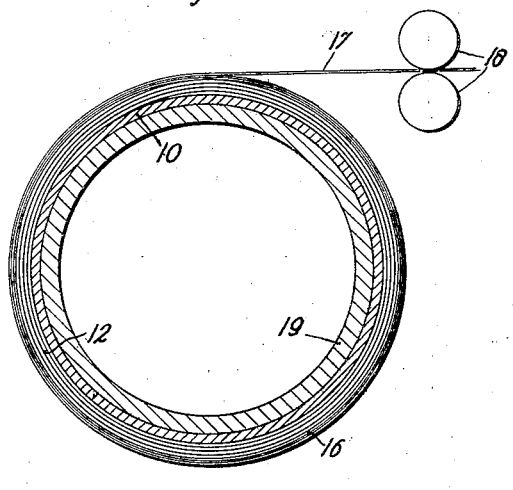
Figure 3 is a view in cross-section of a form of the invention in which a web of paper is wound over the rubber base on the drum or tubular core, which latter in this instance is shown as overweighted.
Figure 4:
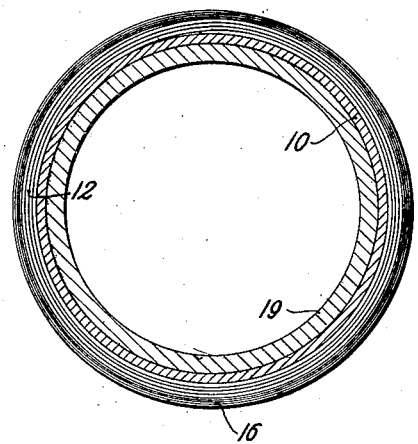
Figure 4 is a view in cross-section of the Figure 3 tube completed.

In Figures 3 and 4, the metal core 10 has the jacket 12 formed thereon of superposed windings of highly-tensioned rubber in the manner described in connection with Figures 1 and 2. The outer jacket or facing 16 in this instance is, however, formed of windings of extremely tough, thin paper 17. The paper web, led from a suitable supply-roll, passes between rolls 18 which tension the same, and thence passes to the jacket or base 12, around which it is tightly wound, layer upon layer, until the platen attains the proper diameter. At intervals a little adhesive may be applied between the windings of paper to keep them tight; and finally the end of the paper is secured by adhesive to the winding next below the same. This last few windings may, throughout the length of the same, be treated with an adhesive, such as glue or mucilage, or with shellac, or with a rubber or other cement, the more firmly to hold the same. Preferably the paper, either before or after formation of the jacket 16, is stained black.

The highly-tensioned rubber surfacing 12 in the platen of Figure 4 acts, as in the platen of Figure 2, to enhance the sharpness of type-impression, and to deaden the noise of type-strokes. In the Figure 4 form of the platen, however, the wear-resisting and type-cushioning paper jacket or facing 16 is itself highly elastic, and has other advantages, which, when it is combined, as described, with the rubber surfacing, results in a platen on which printing of the finest quality may be effected.

In Figures 3 and 4, the tubular metal core 10 is shown as reinforced by a more massive tubular metal core 19 to increase the inertia or resistance of the anvil around which the facing 12 and 16 is wrapped. The overweighting of the central metal core is of importance in securing clearness of the type-impressions. It also conduces to quietness of operation. If desired, the tubular core or anvil part 10 of the Figure 2 platen may similarly be overweighted.

A further advantage gained by the overweighting, is that the type-operating keys can be operated with a very much lighter touch than is the usual practice, since the over-inertia of the weighted platen results in clear type-impressions, even though the type-blows are lighter than heretofore considered practicable. Preferably it is mainly by reason of its inertia that the platen offers sufficient resistance to the type-blows.

Figure 5:
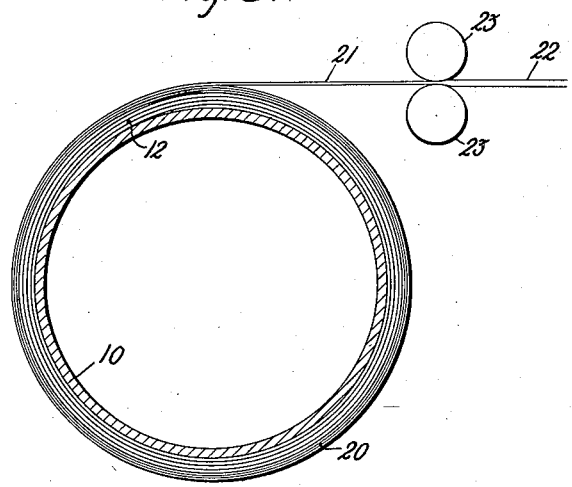
Figure 5 is a view in cross-section of a form of the invention in which a web of gutta-percha is drawn into thin windings upon the rubber facing on the tubular core.
Figure 6:
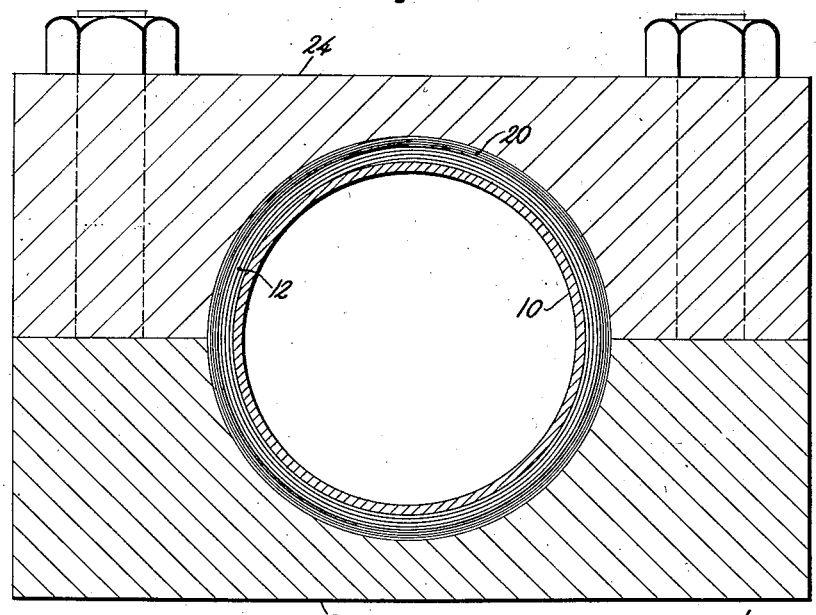
Figure 6 is a view in cross-section of the completely wound Figure 5 platen in a mold in which the gutta-percha is finally shaped and conditioned by heating.

In the Figures 5 and 6 modification of the invention, the tubular metal core 10 and highly-tensioned rubber jacket 12 are again shown, but in this instance the outer jacket or facing 20 is of gutta-percha. The gutta-percha facing, as finally formed on the base 12 is cut into a web or into sheets 22, and passed between rolls 23 and secured at its free end to the jacket 12. Gripped by the rolls 23, the web is then stretched, preferably to nearly its breaking limit; and so is drawn into an extremely thin sheet 21, which is wrapped tightly around the jacket 12, layer upon layer, to the desired thickness of the facing; whereupon its outer end is anchored to the next lower winding in any suitable manner.

The completely wound platen is then placed in a mold having metal matrices 24 and 25 formed to the desired true shape and size of the finished platen; and, by a process, well known in the treatment of gutta-percha, is finally shaped and conditioned by heat under pressure in the mold.

Variations may be resorted to within the scope of the invention, and portions of the improvements may be used without others.

Having thus described my invention, I claim:

1. A platen for a typewriting machine, comprising a core or base of superposed, highly-tensioned sheets or layers of soft rubber, and a facing of resilient material thereon.

2. A platen for a typewriting machine, comprising a core or base of superposed, highly-tensioned sheets or layers of soft rubber, and a facing of superposed thin, tough, tensioned sheets or layers of other material thereon.

3. A platen for a typewriting machine, comprising a core or base of superposed, highly-tensioned sheets or layers of soft rubber, and a facing of other material thereon.

4. A platen for a typewriting machine, comprising a core or base of superposed, highly-tensioned sheets or layers of soft rubber, and a facing thereon of superposed sheets or layers of gutta-percha greatly stretched or distended, and heat molded.

5. A platen for a typewriting machine, comprising a tubular metal core, a core or base formed of superposed windings of highly-tensioned soft rubber on the metal core, and a jacket or facing of resilient material closely fitted over the rubber base.

6. A platen for a typewriting machine, comprising a tubular metal core, a core or base formed of superposed windings of highly-tensioned soft rubber on the metal core, a jacket or facing of resilient material closely fitted over the rubber base, and another metal core within the first-mentioned metal core to serve as an anvil whereby to increase the inertia or resistance of the first-mentioned core.

7. A method of making platens for typewriting machines, comprising winding, in superposed layers over a soft base, a thin web of stretched or distended gutta-percha; and shaping and unifying the windings of gutta-percha in a mold, under the influence of heat, to provide a facing shell for the platen.

8. An overweighted typewriter-platen including an interior anvil in the form of a heavy drum of metal of approximately the full diameter of the platen, and mainly by reason of its inertia offering the required resistance to the type-blows, and relatively shallow surfacing means upon said drum for receiving the type-blows and softening and equalizing the pressure of the type, said surfacing means formed partly of relatively soft interior elastic cushioning material and partly of harder exterior wear-resisting cushioning material.

9. An overweighted typewriter-platen including an interior anvil in the form of a heavy drum of metal of approximately the full diameter of the platen, and mainly by reason of its inertia offering the required resistance to the type-blows, and relatively shallow surfacing means upon said drum for receiving the type-blows and softening and equalizing the pressure of the type, said surfacing means formed partly of tensioned soft-rubber windings and partly of harder exterior wear-resisting cushioning material.

10. A cylindrical platen for a typewriting machine, including an anvil opposing substantial inertia to the shocks of the type-blows, said anvil in the form of an overweighted metal core, a layer of tensioned soft rubber upon said core, and windings of harder material over the rubber.

BURNHAM C. STICKNEY.